United States Patent [19]

Suzuki et al.

[11] 4,425,638

[45] Jan. 10, 1984

[54] DUAL TURNTABLE RECORD PLAYER WITH TORQUE CANCELLATION

[75] Inventors: Masao Suzuki; Yasuhiro Fujimoto, both of Tokyo, Japan

[73] Assignee: Sansui Electric Co., Ltd., Tokyo, Japan

[21] Appl. No.: 297,475

[22] Filed: Aug. 28, 1981

[30] Foreign Application Priority Data

Aug. 28, 1980 [JP] Japan ................... 55-118762

[51] Int. Cl.³ ............................................. G11B 25/04
[52] U.S. Cl. ................................................... 369/265
[58] Field of Search ................... 369/263, 265; 33/321

[56] References Cited

U.S. PATENT DOCUMENTS

| | | | |
|---|---|---|---|
| 2,811,047 | 10/1957 | Christoph | 33/321 |
| 4,079,942 | 3/1978 | Kunen | 369/266 |
| 4,325,133 | 4/1982 | Reitmayer | 369/263 |

Primary Examiner—Steven L. Stephan
Attorney, Agent, or Firm—Sughrue, Mion, Zinn, Macpeak and Seas

[57] ABSTRACT

A record player wherein a second turntable and motor which are respectively equivalent to an ordinary turntable and motor are additionally disposed, and both the motors are driven and controlled so as to cancel their torques each other, thereby to eliminate a cross modulation distortion from a pickup.

11 Claims, 18 Drawing Figures

DUAL TURNTABLE RECORD PLAYER WITH TORQUE CANCELLATION

BACKGROUND OF THE INVENTION

1. Field of the Invention

The present invention relates to a record player of the direct drive system, and more particularly to a record player in which the torque of a motor is cancelled in order to eliminate rotational vibrations.

2. Description of the Prior Art

Figure 1:
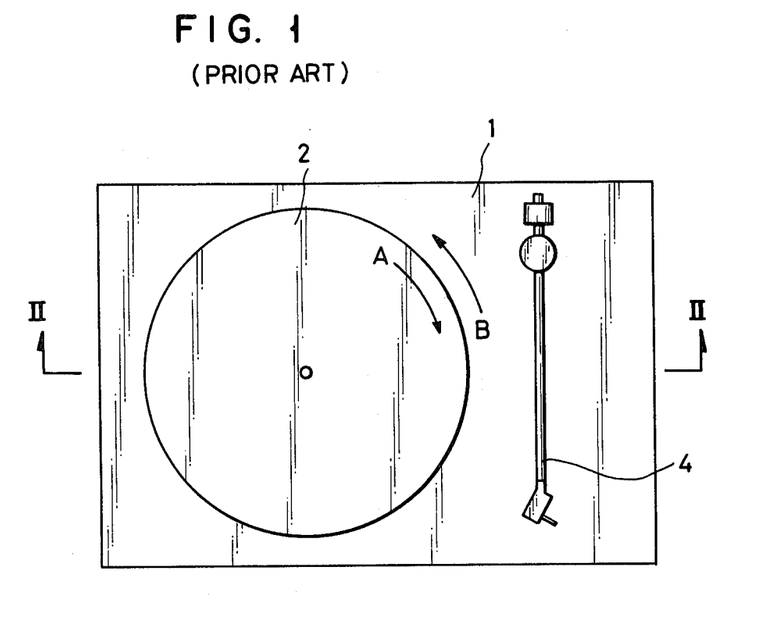
FIG. 1 is a plan view of a prior art record player.
Figure 2:
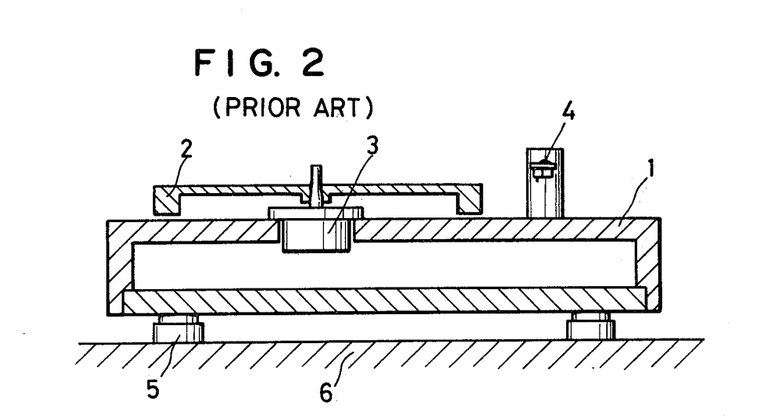
FIG. 2 is a sectional view taken along arrows II—II in FIG. 1.

A prior art record player of the direct drive system is constructed as shown in FIGS. 1 and 2.

In the FIGS., numeral 1 designates a cabinet, on which a turntable 2 is turnably arranged. A motor 3 drives the turntable 2 so as to rotate at a predetermined speed. A tone arm 4 holds a cartridge including a stylus tip which traces the sound groove of a record or disk, not shown, placed on the turntable 2 and which converts it into an electric signal. The cabinet 1 is situated on a fixed member or place 6 such as a floor through insulators 5 which cut off vibrations.

Figure 3:
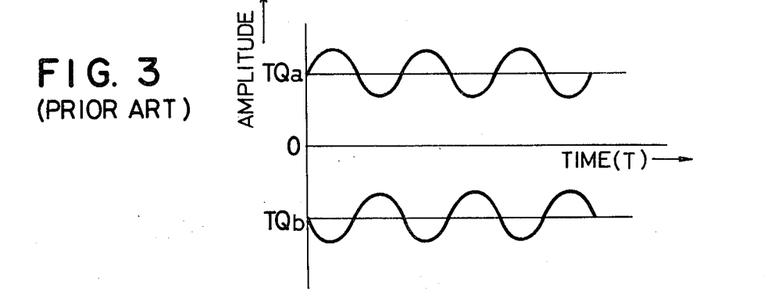
FIG. 3 is a torque waveform diagram for explaining torques developed during the operation of the prior art record player, in which the axis of ordinates represents the amplitude and the axis of abscissas the time.

In such a record player, a torque which is developed by driving the turntable 2 by means of the motor 3 is in the direction of arrow A indicated in FIG. 1, that is, in the CW (clockwise) direction. As a counteraction to this torque, a torque in the direction of arrow B indicated in FIG. 1 or in the CCW (counterclockwise) direction acts on the cabinet 1. In this regard, if the turntable 2 rotates at the constant speed and the torque developed by the motor 3 is constant with time, the counteractive torque on the cabinet 1 will also become constant with time. In general, however, the torque $TQ_a$ acting on the turntable 2, in other words, acting on the rotor of the motor 3, vibrates as a function of the time T as shown in FIG. 3. Accordingly, the torque $TQ_b$ acting on the cabinet 1, in other words, acting on the stator of the motor 3, fluctuates vibrantly as a function of time T in a phase opposite to that of the torque $TQ_a$.

If the cabinet 1 has a great mass and is situated directly on the fixed member 6 so that both are rigidly coupled, then vibrations due to the torque $TQ_b$ will be very small. In such construction, however, vibrations from the side of the fixed member 6 or the so-called floor vibrations ascribable to the walking of the operator, etc. are directly transmitted to the tone arm 4 and give rise to the jump of the stylus, etc. Accordingly, the cabinet 1 needs to be situated on the fixed member 6 through the insulators 5. In the record player of FIGS. 1 and 2 provided with the insulators 5, the cabinet 1 undergoes rotational vibrations in relation to the torque acting on the cabinet 1 and the viscoelasticity of the insulators 5. The rotational vibrations vibrate the cabinet 1 and simultaneously vibrate the tone arm 4, resulting in the disadvantages that the reproduced signal of the disk is affected very adversely, especially a cross modulation or intermodulation distortion being caused, and that the signal-to-noise ratio is degraded.

SUMMARY OF THE INVENTION

The present invention has been made in view of the disadvantages described above, and has for its object to provide a record player which eliminates the adverse effects of a counteraction induced by the rotation of a motor in the record player and which can therefore reproduce a disk at high fidelity.

Another object of the present invention is to provide a record player in which in order to eliminate the adverse effects of a counteraction induced by the rotation of a motor in the record player, a second turntable and motor respectively equivalent to an ordinary or first turntable and motor are disposed, and the second motor is rotated in the direction reverse to the rotational direction of the ordinary motor.

Still another object of the present invention is to provide a record player in which the rotations of first and second motors are controlled in accordance with output voltages obtained by detecting the speeds of, and comparing the phases of, the rotations of first and second turntables respectively driven by the first and second motors, thereby to eliminate vibrations induced by the motors.

The above-mentioned and other objects and features of the present invention will become more apparent from the following detailed description taken in conjunction with the drawings.

DESCRIPTION OF THE PREFERRED EMBODIMENTS

Figure 4:
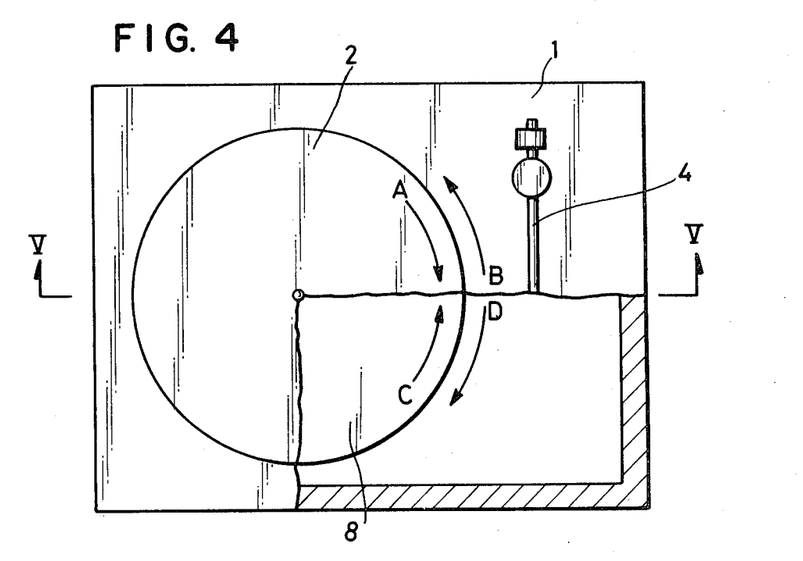
FIG. 4 is a plan view, partly in section, of a record player according to the present invention.
Figure 5:
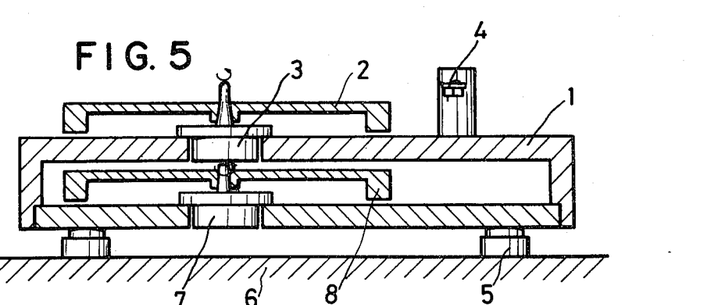
FIG. 5 is a sectional view taken along arrows V—V in FIG. 4.

An embodiment of the record player according to the present invention will be described in detail with reference to FIGS. 4 to 8. In FIGS. 4 and 5, the same parts as in FIGS. 1 and 2 are assigned the same symbols.

More specifically, nemeral 1 designates a cabinet, on which a first turntable 2 is turnably arranged. A first motor 3 drives the first turntable 2 so as to rotate at a predetermined speed. A tone arm 4 holds a cartridge including a stylus tip which traces the sound groove of a record or disk, not shown, placed on the first turntable 2 and which converts it into an electric signal. The cabinet 1 is situated on a fixed member or place 6 such as a floor through insulators 5.

Numeral 7 indicates a second motor which is disposed coaxially with the first motor 3. Further, numeral 8 indicates a second turntable which is driven and rotated by the second motor 7. The second motor 7 and turntable 8 are arranged inside the cabinet 1, in other words, on the bottom plate side thereof. In this embodiment, the second motor 7 and turntable 8 are identical in construction to the first motor 3 and turntable 2 in both electrical and mechanical points, respectively, so as to equalize the moments of inertia of the respective combined motors and turntables about the common axis of rotation thereof. In addition, the first and second motors 3 and 7 are driven so as to rotate in opposite directions.

Figure 6:
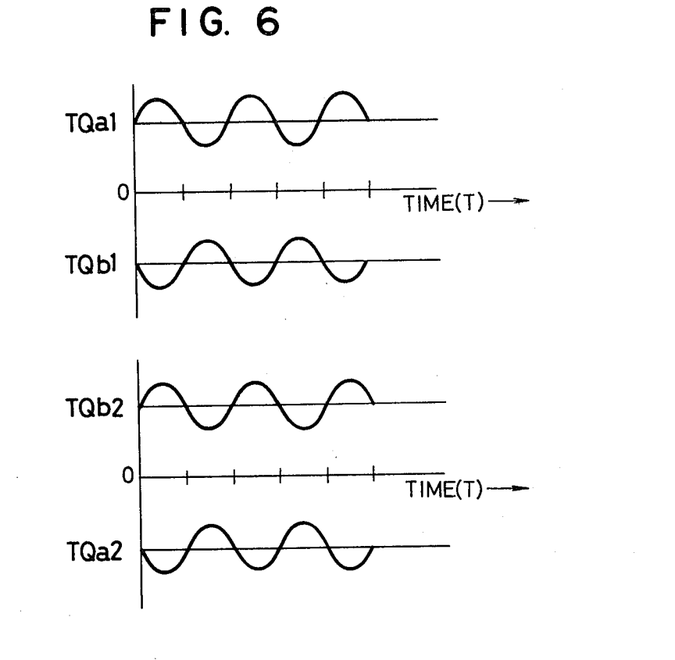
FIG. 6 is a torque waveform diagram similar to FIG. 3 for explaining torques developed during the operation of the record player of the present invention.
Figure 7:
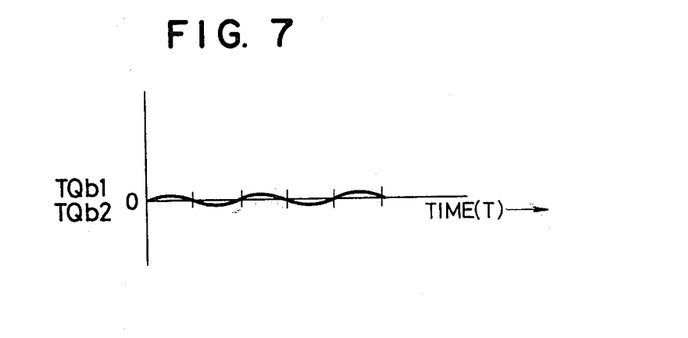
FIG. 7 is a torque waveform diagram similar to FIG. 3 for explaining a cancellation torque developed in the record player of the present invention.

With such construction and operation, as illustrated in FIG. 6, torques $TQ_{a1}$ and $TQ_{b1}$ are respectively developed by an action and a counteraction based on the rotation of the first motor 3, and torques $TQ_{a2}$ and $TQ_{b2}$ are respectively developed by an action and a counteraction based on the rotation of the second motor 7. The counteractive torques $TQ_{b1}$ and $TQ_{b2}$ which are respectively developed by the rotations of the first and second motors 3 and 7 and which give the cabinet 1 rotational vibrations are in opposite directions and thus cancel each other, so that their sum $(TQ_{b1}+TQ_{b2})$ becomes very feeble as shown in FIG. 7. More specifically, the counteractive torques $TQ_{b1}$ and $TQ_{b2}$ have their resultant value varied depending upon the frequency components, amplitudes and phases thereof. Accordingly, if the first and second motors 3 and 7 and the first and second turntables 2 and 8 are respectively equivalent both electrically and mechanically, the frequency components and amplitudes of the vibrations induced by the torques during the rotations of the motors and the turntables will become equal and the phases thereof will become opposite to each other, so that the resultant value of the vibrations will become zero.

Figure 8:
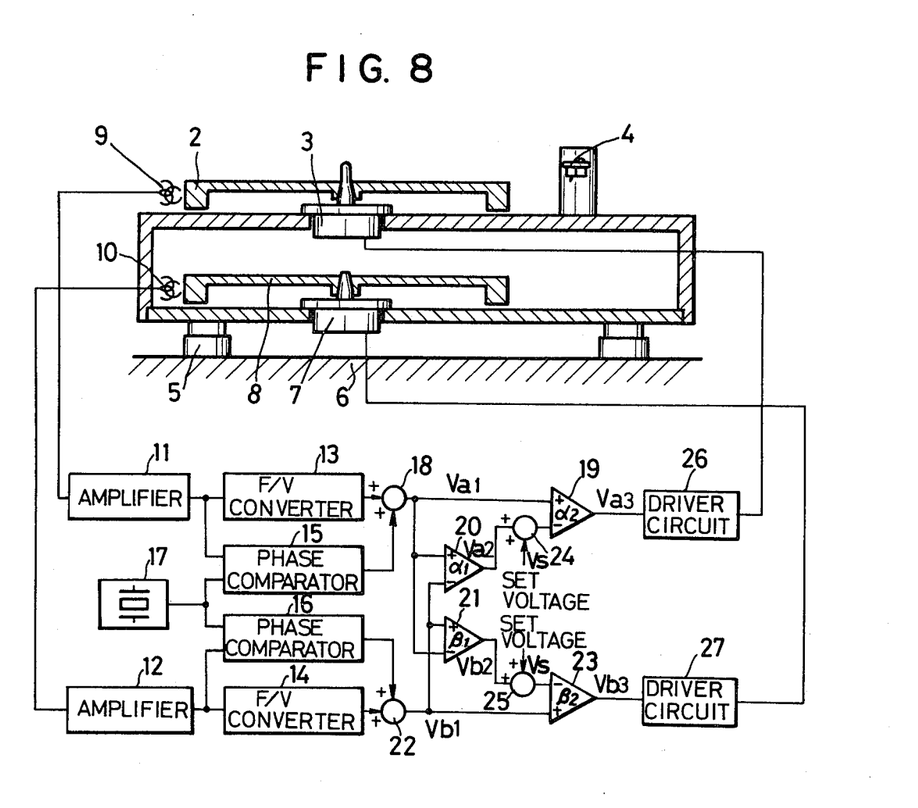
FIG. 8 is a block diagram of a control system according to the present invention.

FIG. 8 is a block diagram of a control system of the embodiment described above. The rotating speeds of the first and second turntables 2 and 8 are respectively detected by first and second speed detectors 9 and 10 in the form of pulse trains having frequencies proportional to the rotating speeds. The detection outputs are respectively applied to first and second frequency-to-voltage converters 13 and 14 and first and second phase comparators 15 and 16 through amplifiers 11 and 12. Each of the frequency-to-voltage converters 13 and 14 provides a voltage which is inversely proportional to the frequency of the input pulses thereof. That is, the output voltage becomes small when the rotating speed is high, and it becomes great when the rotating speed is low. Each of the phase comparators 15 and 16 provides a voltage which is proportional to the phase angle between the output of a reference oscillator unit 17 including a quartz oscillator or the like and the aforerecited input pulses. That is, the output voltage becomes small when the phase of the input signal leads, and it becomes great when the phase thereof lags. The output voltages of the first frequency-to-voltage converter 13 and the first phase comparator 15 are added by a first adder 18. The resulting sum is applied to the noninverting inputs of first and second operational amplifiers 19 and 20 and the inverting input of a third operational amplifier 21. On the other hand, the output voltages of the second frequency-to-voltage converter 14 and the second phase comparator 16 are added by a second adder 22, and the resulting sum is applied to the noninverting inputs of third and fourth operational amplifiers 21 and 23 and the inverting input of the second operational amplifier 20. Subsequently, the output of the second operational amplifier 20 is added to a set voltage applied externally, by a third adder 24. The resulting sum is applied to the inverting input of the first operational amplifier 19. On the other hand, the output of the third operational amplifier 21 is added to a set voltage applied externally, by a fourth adder 25, and the resulting sum is applied to the inverting input of the fourth operational amplifier 23. The outputs of the first and fourth operational amplifiers 19 and 23 are respectively applied to first and second driver circuits 26 and 27 so as to drive the first and second motors 3 and 7. Each of the first and second driver circuits 26 and 27 supplies a motor driving current proportional to its input voltage. The driving current and the torque to be developed are made proportional.

Here will be described the conditions under which the resultant value of the torques $TQ_{b1}$ and $TQ_{b2}$ developed by the counteractions of the rotations of the first and second motors 3 and 7 becomes zero. Letting $V_{a1}$ and $V_{b1}$ denote the output voltages of the first and second adders 18 and 22 respectively, the output voltages $V_{a2}$ and $V_{b2}$ of the second and third operational amplifiers 20 and 21 are respectively given by the following expressions (1) and (2):

$$V_{a2}=(V_{a1}-V_{b1})\alpha_1 \tag{1}$$

$$V_{b2}=(V_{b1}-V_{a1})\beta_1 \tag{2}$$

where $\alpha_1$ denotes the gain of the second operational amplifier 20, and $\beta_1$ denotes the gain of the third operational amplifier 21.

Further, the output voltage $V_{a3}$ and $V_{b3}$ of the first and fourth operational amplifiers 19 and 23 are respectively given by the following expressions (3) and (4):

$$V_{a3}=\{V_{a1}-(V_{a2}+V_s)\}\alpha_2 \tag{3}$$

$$V_{b3}=\{V_{b1}-(V_{b2}+V_s)\}\beta_2 \tag{4}$$

where $V_s$ denotes the set voltage, $\alpha_2$ denotes the gain of the first operational amplifier 19, and $\beta_2$ denotes the gain of the fourth operational amplifier 23.

From expressions (1), (2), (3) and (4), the following expressions (5) and (6) are obtained:

$$V_{a3} = [V_{a1} - \{(V_{a1} - V_{b1}) \cdot \alpha_1 + V_s\}]\alpha_2 \qquad (5)$$

$$V_{b3} = [V_{b1} - \{(V_{b1} - V_{a1}) \cdot \beta_1 + V_s\}]\beta_2 \qquad (6)$$

In order to render the resultant value of the counteractive torques zero, expressions (5) and (6) may be equal. Therefore, the following expression (7) may be met:

$$V_{a3} - V_{b3} = \{V_{a1} - (V_{a1} - V_{b1})\alpha_1\}\alpha_2 - \{V_{b1} - (V_{b1} - V_{a1})\beta_1\}\beta_2 - V_s(\alpha_2 - \beta_2) = 0 \qquad (7)$$

Supposing here that the first and second motors 3 and 7 and the first and second turntables 2 and 8 are respectively equivalent both electrically and mechanically, the respective gains $\alpha_2$ and $\beta_2$ of the first and fourth operational amplifiers 19 and 23 need to be equalized.

From expression (7), accordingly, the following expression (8) is obtained:

$$(V_{a1} - V_{b1})\{1 - (\alpha_1 + \beta_1)\} = 0 \qquad (8)$$

Thus, when expression (8) is met, the resultant value of the counteractive torques becomes zero. Herein, although the condition of $V_{a1} - V_{b1} = 0$ that the control voltages of the first and second motors 3 and 7 are equal can be established at a certain instant, it cannot be held continuously. It is therefore impossible to rely on this condition. On the other hand, it is readily realizable to hold the condition of $\alpha_1 + \beta_1 = 1$, in other words, to control the gains of the second and third operational amplifiers 20 and 21. Accordingly, when the following expressions (9) and (10) hold as to the respective gains $\alpha_2$, $\alpha_1$, $\beta_1$ and $\beta_2$ of the first to fourth operational amplifiers 19, 20, 21 and 23, the torques to act on the cabinet 1 can be made zero:

$$\alpha_1 + \beta_1 = 1 \qquad (9)$$

$$\alpha_2 = \beta_2 \qquad (10)$$

By cancelling each other the counteractive torques due to the rotations of the first and second motors 3 and 7 in this way, the rotational vibrations of the cabinet 1 are prevented, whereby the cross modulation distortion can be eliminated and the signal-to-noise ratio can be improved.

Figure 9:
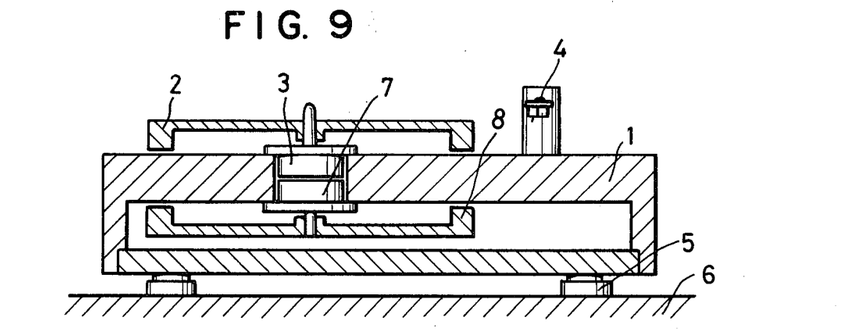
FIG. 9 is a sectional view similar to FIG. 5, showing another embodiment of the record player of the present invention.
Figure 10:
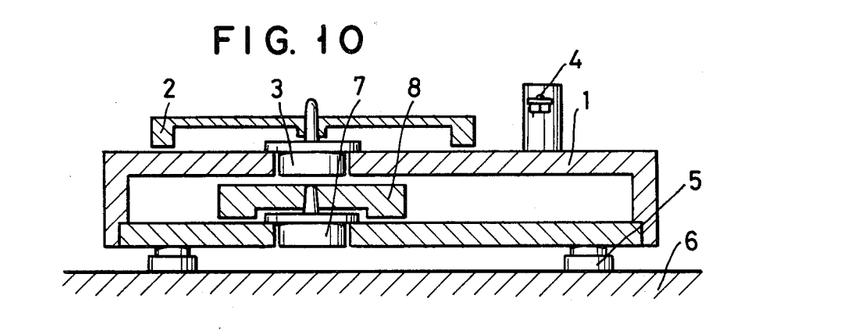
FIGS. 10 and 11 are sectional views similar to FIG. 5, each showing still another embodiment of the record player of the present invention.
Figure 11:
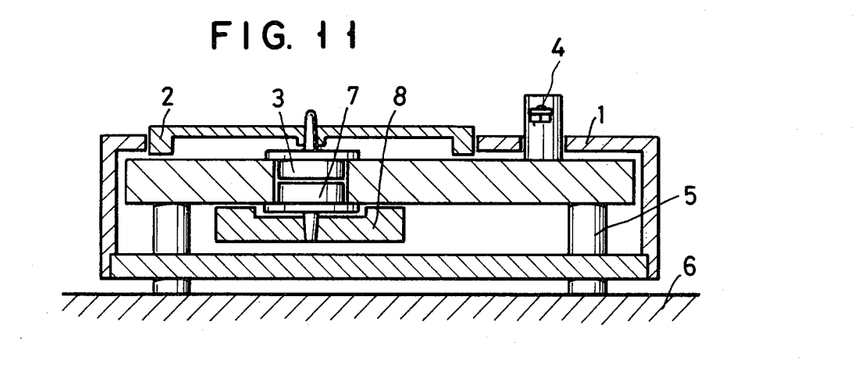

The present invention is not restricted to the foregoing embodiment, but various modifications can be made. For example, as shown in FIG. 9, the second motor 7 and second turntable 8 may well be arranged in the opposite direction and coaxially with respect to the first motor 3 and first turntable 2. As shown in FIG. 10 or FIG. 11, the second turntable 8 may well be made smaller than the first turntable 2 in diameter and equal thereto in the moment of inertia about the axis of rotation and arranged coaxially with the latter in the same or opposite direction.

Figure 12:
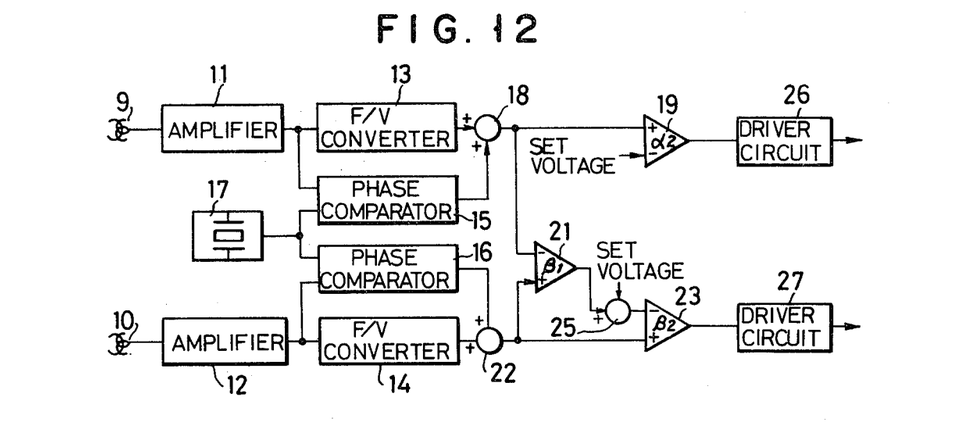
FIG. 12 is a block diagram showing another embodiment of the control system of the record player of the present invention.
Figure 13:
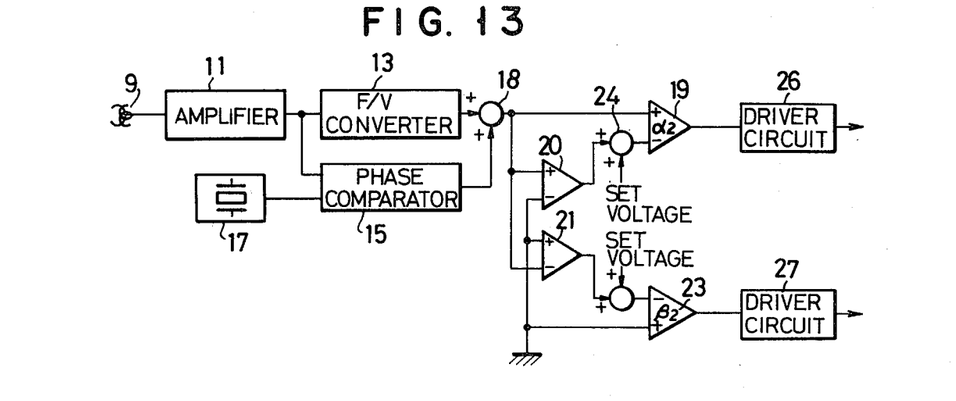
FIGS. 13 and 14 are block diagrams each showing still another embodiment of the control system of the record player of the present invention.
Figure 14:
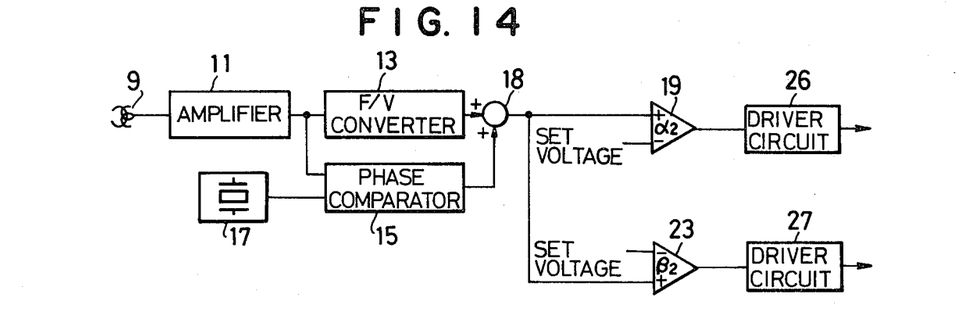

In addition, the control system can be constructed as shown in FIG. 12. The gains of the second and third operational amplifiers 20 and 21 can be made $\alpha_1 = 0$ and $\beta_1 = 1$ by omitting the second operational amplifier 20 and the third adder 24 shown in FIG. 8. In another embodiment shown in FIG. 13, only the first turntable 2 is provided with the speed detector 9 and the output voltage of the second adder 22 shown in FIG. 8 is made $V_{b1} = 0$ so as to dispense with the second speed detector 10, amplifier 12, frequency-to-voltage converter 14, phase comparator 16 and adder 22. Further, as shown in FIG. 14, the second and third operational amplifiers 20 and 21 may well be removed from the control system of FIG. 13 so as to apply the output voltage of the first adder 18 to the first and fourth operational amplifiers 19 and 23 in parallel.

Figure 15:
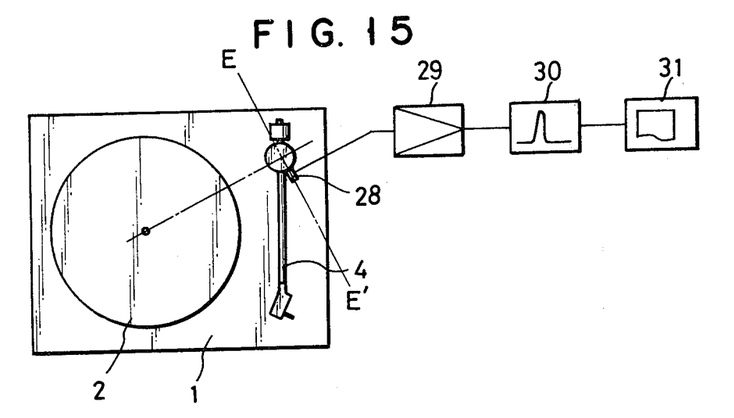
FIG. 15 is a block diagram of an arrangement used for measuring the vibrations of the fulcra of tone arms in the record players of the present invention and the prior art.
Figure 16:
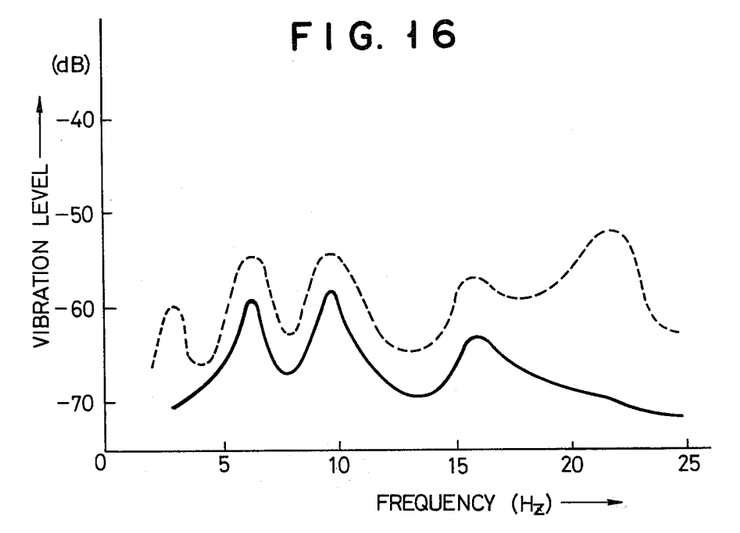
FIG. 16 is a frequency characteristic diagram showing the measured results of the vibrations of the fulcra of the tone arms in FIG. 15, in which the axis of abscissas represents the frequency and the axis of ordinates the vibration level.

FIGS. 15 and 16 are block diagrams of arrangement for measuring vibrations at the fulcrum of the tone arm 4 of the embodiment shown in FIG. 8, and a graph showing the measured results, respectively. More specifically, a vibration detector 28 such a piezo electric accelerometer is installed on the fulcrum of the tone arm 4 so as to detect vibrations in the direction of E-E' indicated in FIG. 15. After the detection output is amplified by an amplifier 29, it is analyzed by a frequency analyzer 30. The analyzed result is recorded by a recorder 31. In FIG. 16, the axis of abscissas represents the vibration frequency, and the axis of ordinates the vibration level. A broken line indicated in the graph denotes the characteristic obtained by driving only the first motor 3 (the characteristic corresponding to the prior art shown in FIGS. 1 and 2), while a solid line denotes the characteristic obtained by driving both the first and second motors 3 and 7.

Figure 17:
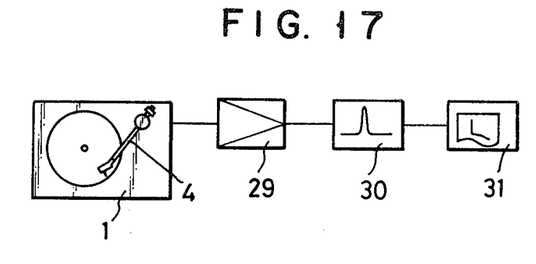
FIG. 17 is a block diagram of an arrangement used for measuring cross modulation distortion characteristics under the condition that a test record with a signal of 125 Hz recorded thereon was set on and played by the record players of the present invention and the prior art.
Figure 18:
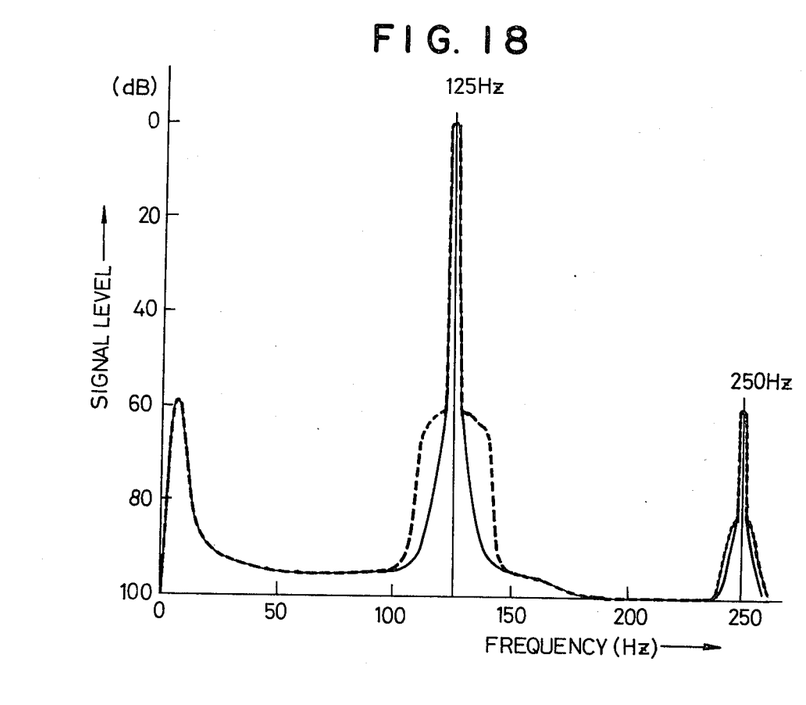
FIG. 18 is a frequency characteristic diagram showing the measured results of the cross modulation distortion characteristics in FIG. 17, in which the axis of abscissas represents the frequency and the axis of ordinates the signal level.

FIGS. 17 and 18 are a block diagram of an arrangement for measuring, in the embodiment shown in FIG. 8, the cross modulation distortion characteristic by the use of a test record with a signal of 125 Hz recorded thereon, and a graph showing the measured results, respectively. More specifically, after the reproduced output of the record is amplified by the amplifier 29 and analyzed by the frequency analyzer 30, the analyzed result is recorded on the recorder 31. In FIG. 18, the axis of abscissas represents the frequency, and the axis of ordinates the signal level. A broken line indicated in the graph denotes the characteristic obtained by driving only the first motor 3 (the characteristic corresponding to the prior art shown in FIGS. 1 and 2), while a solid line denotes the characteristic obtained by driving both the first and second motors 3 and 7. In the graph of FIG. 18, a peak at or below 10 Hz corresponds to the resonance of the tone arm or the cartridge and is recorded as a noise. A peak at or near 125 Hz is the reproduced signal, and a peak at or near 250 Hz is the second higher harmonics of the cartridge etc.

As apparent from the measured results illustrated in FIGS. 16 and 18, the vibrations at the fulcrum of the tone arm can be conspicuously reduced in a broad frequency band and the cross modulation distortion can also be lessened by driving the two motors 3 and 7 at the same time and so as to cancel the counteractive torques each other.

As described above in detail, the present invention consists in that a second motor for driving a second turntable is arranged coaxially with a first motor for driving a first turntable so as to cancel each other counteractions exerted by the torques of the rotations of the respective turntables on a cabinet. Accordingly, even when the cabinet is held through insulators to the end of preventing the floor vibrations etc., the vibrations of the cabinet are prevented, whereby a record player capable of attaining a good cross modulation distortion characteristic and a high signal-to-noise ratio can be provided.

We claim:

1. A record player, comprising:
   (a) a first motor (3) mounted in a cabinet (1) on which a tone arm (4) including a pickup is mounted,
   (b) a first turntable (2) coupled to an output shaft of and rotatably driven by said first motor,
   (c) a second motor (7) mounted in the cabinet coaxially with said first motor,
   (d) a second turntable (8) coupled to an output shaft of and rotatably driven by said second motor, and
   (e) means for controlling said first and second motors to rotationally drive said respective first and second turntables in opposite directions such that torque vibrations developed by said motors are substantially equal in amplitude but opposite in phase, and thereby cancel each other.

2. A record player as claimed in claim 1, wherein the combined first turntable and motor and the combined second turntable and motor are structurally identical both electrically and mechanically and have equal moments of inertia about a common axis of rotation of said motors.

3. A record player as claimed in claim 1, wherein said second turntable has a diameter smaller than that of said first turntable, and the combined first turntable and motor and the combined second turntable and motor have equal moments of inertia about a common axis of rotation of said motors.

4. A record player as claimed in claim 1, wherein said first and second motors are coaxially arranged in a manner to face in opposite directions.

5. A record player as claimed in claim 1, wherein said control means comprises speed detection means to detect a rotating speed of said first or second turntable, addition means to add a voltage obtained by converting the speed detection output and a voltage obtained by comparing a phase of said speed detection output with a reference phase, and a control unit which controls the rotational speed of said first and second motors on the basis of an output from said addition means.

6. A record player, comprising: a first motor (3) mounted in a cabinet (1) on which a tone arm (4) including a pickup is mounted, a first turntable (2) coupled to an output shaft of and rotatably driven by said first motor, a second motor (7) mounted in the cabinet coaxially with said first motor, a second turntable (8) coupled to an output shaft of and rotatably driven by said second motor, speed detection means to detect a rotating speed of said first or second turntable, phase comparison means to compare a phase of an output from said speed detection means with a reference phase, voltage conversion means to convert the speed detection output into a voltage, adding means to add an output from said phase comparison means and an output from said voltage conversion means, and amplification means capable of controlling its gain for an output from said adding means with an externally set voltage, an output from said amplification means being applied to said first and second motors to rotatably drive said respective first and second turntables in opposite directions such that torque vibrations developed by said motors are substantially equal in amplitude but opposite in phase, and thereby cancel each other.

7. A record player as claimed in claim 6, wherein the output of said adding means proportional to the rotating speed of said first or/and second turntable is applied to operational amplification means, an output of which is applied to said amplification means.

8. A record player as claimed in claim 6, wherein only the speed detection output of said first or second turntable is applied to said adding means, and the output from said adding means is applied to the two amplification means in parallel so as to control the rotations of said first and second motors.

9. A record player as claimed in claim 6, wherein only the speed detection output of said first or second turntable is applied to two operational amplification means, outputs of which are applied to said amplification means so as to control the rotations of said first and second motors.

10. A record player as claimed in claim 6, wherein the two amplification means whose outputs are applied to said first and second motors have equal gains.

11. A record player as claimed in claim 7, wherein a gain of said operational amplification means is 1 (unity).

* * * * *